(12) United States Patent
Camacho et al.

(10) Patent No.: US 8,712,404 B2
(45) Date of Patent: Apr. 29, 2014

(54) MEASUREMENT SYSTEM SERVICE FOR A VEHICLE INSTRUMENT PANEL

(75) Inventors: Esteban Camacho, Belleville, MI (US); Shpetim S. Veliu, Livonia, MI (US); Dexter C. Lowe, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/555,854

(22) Filed: Jul. 23, 2012

(65) Prior Publication Data
US 2014/0024390 A1    Jan. 23, 2014

(51) Int. Cl.
*H04W 4/00* (2009.01)
(52) U.S. Cl.
USPC ............. 455/424; 455/456.3; 455/456.6; 455/457; 455/422.1; 455/418
(58) Field of Classification Search
USPC ......... 455/424, 456.3, 456.6, 457, 422.1, 418
See application file for complete search history.

(56) References Cited

U.S. PATENT DOCUMENTS

| | | | | |
|---|---|---|---|---|
| 7,629,878 | B2 * | 12/2009 | Quigley et al. | 340/461 |
| 2010/0217723 | A1 * | 8/2010 | Sauerwein et al. | 705/337 |
| 2012/0054032 | A1 * | 3/2012 | Kolodziej | 705/14.58 |
| 2012/0062392 | A1 * | 3/2012 | Ferrick et al. | 340/905 |
| 2013/0262311 | A1 * | 10/2013 | Buhrmann et al. | 705/44 |

* cited by examiner

*Primary Examiner* — Khai M Nguyen
(74) *Attorney, Agent, or Firm* — Cantor Colburn LLP

(57) ABSTRACT

A wireless interface disposed in a vehicle monitors a network for signals transmitted by cellular towers. The signals include a first system identification signal transmitted from a first cellular tower. A computer processing device is communicatively coupled to the wireless interface and includes logic configured to receive the first system identification signal in response to the monitoring. The first system identification signal corresponds to a first system identification. The logic is also configured to retrieve a table of system identifications including the first system identification from a storage device. Each of the system identifications is mapped to a corresponding geographic location in which each of the cellular towers is disposed and a corresponding measurement system utilized in the geographic location. The logic is also configured to identify the measurement system from which the first system identification is mapped, and display indicators of the measurement system within an instrument panel.

18 Claims, 2 Drawing Sheets

MEASUREMENT SYSTEM SERVICE FOR A VEHICLE INSTRUMENT PANEL

FIELD OF THE INVENTION

The subject invention relates to vehicle electronics and, in particular, to a measurement system service for a vehicle instrument panel.

BACKGROUND

Vehicle instrument panels provide useful information to vehicle operators, such as current speed, fuel consumption, and distance traveled. Vehicle manufacturers typically build instrument panels designed for use in a specified region or country. For example, vehicles manufactured for sale in the United States are built with instrument panels that utilize a measurement system adopted by the United States, while vehicles manufactured for sale in Canada may be built with instrument panels that utilize a measurement system adopted for use in that country.

Some vehicles are designed to provide an operator with the ability to switch between differing measurement systems for traveling in areas employing varying measurement systems, whereby the vehicles utilize global positioning system (GPS)-based information to determine a particular location, and therefore, a measurement system to use. However, GPS-based determinations can sometimes result in false positives, thereby rendering inaccurate location information.

Accordingly, it is desirable to provide a way to provide a reliable measurement system based on a current location of vehicle.

SUMMARY OF THE INVENTION

In one exemplary embodiment of the invention a system for implementing a measurement system service via an instrument panel of a vehicle is provided. The system includes a wireless interface disposed in the vehicle. The wireless interface monitors a network for signals transmitted by cellular towers. The signals include a first system identification signal transmitted from a first cellular tower of the cellular towers. The system also includes a computer processing device communicatively coupled to the wireless interface, and logic executable by the computer processing device. The logic is configured to implement a method. The method includes receiving, via the wireless interface in response to the monitoring, the first system identification signal from the first cellular tower. The first system identification signal uniquely identifies the first cellular tower by a first system identification. The method also includes retrieving a table of system identifications including the first system identification from a storage device. Each of the system identifications is mapped to a corresponding geographic location in which each of the cellular towers is disposed and a corresponding measurement system utilized in the geographic location. The method further includes identifying the measurement system from which the first system identification is mapped, and displaying indicators of the measurement system within the instrument panel of the vehicle.

In another exemplary embodiment of the invention a method for implementing a measurement system service via an instrument panel of a vehicle is provided. The method includes monitoring a network for signals transmitted by cellular towers. The signals include a first system identification signal transmitted from a first cellular tower of the cellular towers. The method also includes receiving, via a computer processing device communicatively coupled to the wireless interface in response to the monitoring, the first system identification signal from the first cellular tower. The first system identification signal uniquely identifies the first cellular tower by a first system identification. The method further includes retrieving a table of system identifications including the first system identification from a storage device. Each of the system identifications is mapped to a corresponding geographic location in which each of the cellular towers is disposed and a corresponding measurement system utilized in the geographic location. The method also includes identifying the measurement system from which the first system identification is mapped, displaying indicators of the measurement system within an instrument panel of the vehicle.

In yet another exemplary embodiment of the invention a computer program product for implementing a measurement system service via an instrument panel of a vehicle is provided. The computer program product includes a computer storage medium having program instructions embodied thereon, which when executed by a computer processor cause the computer processor to implement a method. The method includes monitoring a network for signals transmitted by cellular towers. The signals include a first system identification signal transmitted from a first cellular tower of the cellular towers. The method also includes receiving, via the wireless interface in response to the monitoring, the first system identification signal from the first cellular tower. The first system identification signal uniquely identifies the first cellular tower by a first system identification. The method further includes retrieving a table of system identifications including the first system identification from a storage device. Each of the system identifications is mapped to a corresponding geographic location in which each of the cellular towers is disposed and a corresponding measurement system utilized in the geographic location. The method also includes identifying the measurement system from which the first system identification is mapped, displaying indicators of the measurement system within an instrument panel of a vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, a measurement system for a vehicle instrument panel (also referred to herein as "measurement system services") is provided. A measurement system is selectively employed on an instrument panel of a vehicle based on the vehicle's location as determined by cellular towers disposed in a region in which the vehicle is located. A look up table of system identifications of cellular towers, which are mapped to measurement systems utilized in regions corresponding to the system identifications, is used to particularly identify the relevant measurement system to implement on the instrument panel.

Figure 1:
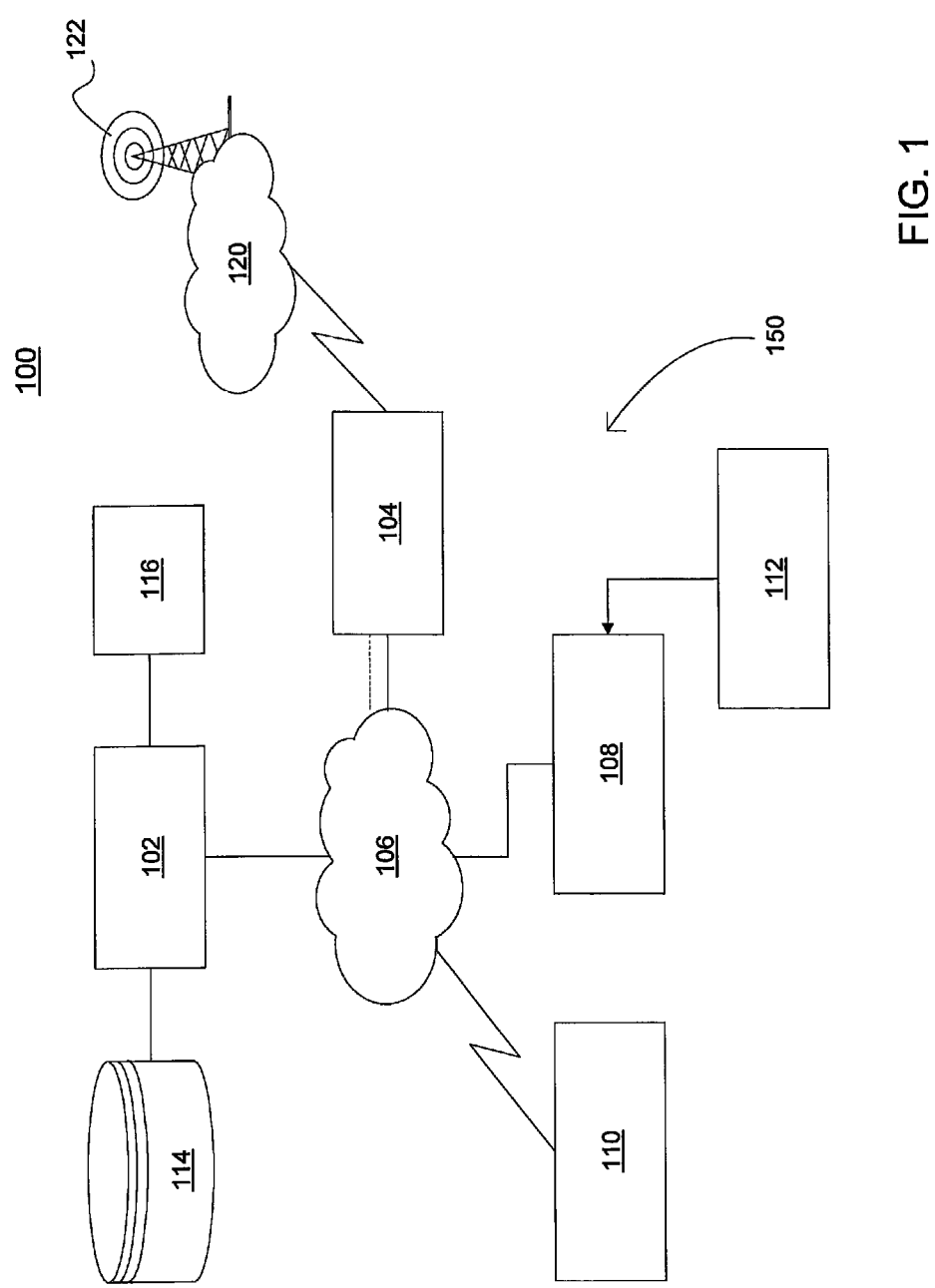
FIG. 1 is a diagram of a system upon which a measurement system for a vehicle instrument panel may be implemented in an exemplary embodiment.

Turning now to FIG. 1, a system 100 upon which the measurement system services may be implemented will now be described in accordance with an embodiment. The system 100 of FIG. 1 illustrates a portion of a vehicle 150 in communication with a cellular network 120 via a wireless interface 104. The vehicle 150 may be any type of automobile.

The vehicle 150 includes a controller 102 communicatively coupled to the wireless interface 104 over a vehicle network 106. The controller 102 is also communicatively coupled to input/output (I/O) components 108 and an instrument panel 110 including related circuitry over the vehicle network 106. The vehicle network 106 may be implemented wirelessly (e.g., a wireless local area network (LAN)) or through wired connections (e.g., a communication bus).

The controller 102 may include one or more computer processing circuits and may be implemented using various computer hardware and software technology known in the art, such as one or more processing units, volatile and non-volatile memory, power supplies, support circuitry, and operating systems. In an embodiment, the controller 102 may be an onboard centralized computer system that manages various electronic modules within the vehicle 150. Logic 116 is configured for execution by the controller 102 for implementing the exemplary measurement system services described herein. The logic 116 may be implemented in hardware, software, or a combination thereof.

The I/O components 108 may include input buttons associated with a radio or infotainment system, as well as audio speakers and a display device for outputting information to the vehicle occupants. As shown in FIG. 1, the I/O components 108 also include voice recognition system components 112. The voice recognition system components 112 may be part of a telematics system integrated with the vehicle 150. For example, telematics systems typically include speech recognition software and text-to-speech software, as well as related devices, such as microphones and speakers, to receive and respond to voice communications.

The instrument panel 110 provides an operator of the vehicle 150 with vehicle speed, distance traveled, fuel consumption, and other information. The instrument panel 110 may be implemented as a mechanically-driven system with components, such as a speedometer needle or pointer, a motor, and visual representations of varying speeds to which the pointer is guided by a motor via the controller 102 based on the operating speed of the vehicle 150. Alternatively, the instrument panel 110 may be implemented using digital technology configured as hardware and software that interfaces with the controller 102 and uses light emitting diodes (LEDs) or other illumination means of displaying the operating speed of the vehicle 150 and other related information.

The wireless interface 104 may include telematics components, such as a transceiver that is configured to communicate with the cellular network 120 using, e.g., code division multiple access (CDMA) wireless communications standards or global system for mobile communications (GSM) wireless communications standards. In one embodiment, the wireless interface 104 may be implemented by telematics components provided by a service provider, such as OnStar®. In another embodiment, the wireless interface 104 may include short-range wireless communications components, such as WiFi or Bluetooth®-enabled network interfaces.

In a further embodiment, the wireless interface 104 may form part of a portable communications device that is independent of the vehicle 150. The portable communications device may be a cellular telephone or smart phone. The portable communications device may receive cellular communications services from a service provider over a cellular network, such as network 120. The portable communications device may also include a wireless interface that supports short-range wireless communications protocols, such as WiFi or Bluetooth to wirelessly communicate with the vehicle network 106, as indicated in FIG. 1 by a dashed line. In an embodiment, the portable communications device is operated by an occupant of the vehicle 150.

A storage device 114 of the vehicle 150 is communicatively coupled to the controller 102. The storage device 114 stores a look up table used by the logic 116 in implementing the exemplary measurement system services described herein. The storage device 114 is logically addressable as a data source by the controller 102 and logic 116. Information stored in the look up table includes system identifications of cellular towers, such as cellular tower 122. The system identifications each uniquely identify a corresponding cellular tower and may also identify the geographic location of that cellular tower. In an embodiment, the system identifications are mapped in the look up table to corresponding locations of the cellular towers, as well as measurement systems utilized in these areas.

The cellular tower 122 facilitates communications between devices configured for cellular communications, such as the wireless interface 104, over the cellular network 120. The cellular tower 122 is configured to transmit its system identification over the cellular network 120, which can be used to identify the cellular tower 122, e.g., when devices are roaming between area cells in the cellular network 120. It will be understood that only one cellular tower 122 is shown in FIG. 1 for simplicity and that any number of cellular towers may be employed in realizing the embodiments of the invention.

In an embodiment, the look up table is configured to store the system identifications for cellular towers corresponding to geographic locations serviced by the measurement system. The look up tower includes the system identifications of the cellular towers, which are mapped to corresponding measurement systems utilized in the geographic locations corresponding to the cellular towers. A sample data structure format for the look up table is shown below:

SYSTEM_ID
GEOGRAPHIC_LOC
MEASUREMENT_SYSTEM

It is understood that there may be multiple indicators for a given measurement system. For example, if the measurement system employs the metric system standard, the indicators may include fuel consumption represented as kilometers-per-liter, distance traveled measured in kilometers, and speed represented as kilometers-per-hour. If the measurement system employs a U.S. system, the indicators may include fuel consumption represented as miles-per-gallon, distanced traveled in miles, and speed represented as miles-per-hour.

Figure 2:
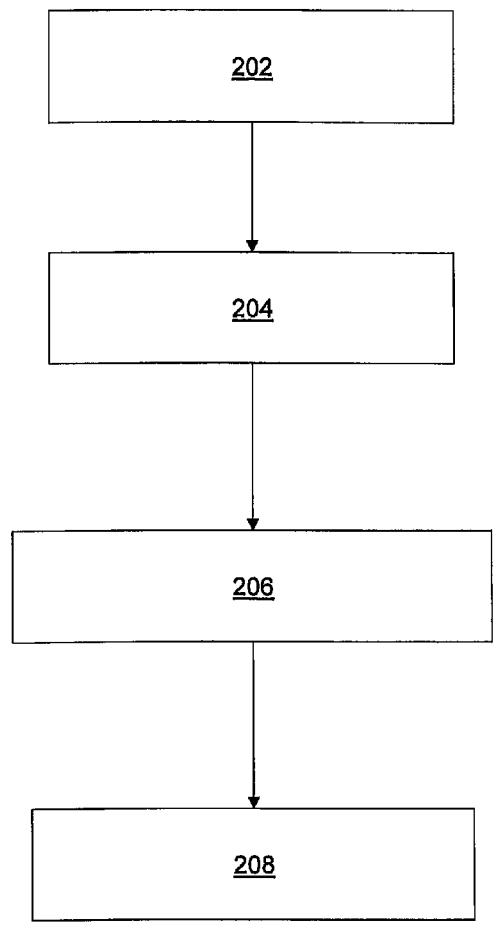
FIG. 2 is a flow diagram of a process for implementing the measurement system for a vehicle instrument panel in an exemplary embodiment.

As indicated above, the measurement system services are implemented in which a measurement system is selectively employed on an instrument panel of a vehicle based on the vehicle's location as determined by cellular towers disposed in a region in which the vehicle is located. A look up table of system identifications of cellular towers, which identifications are mapped to measurement systems utilized in regions corresponding to the system identifications, is used to particularly identify the relevant measurement system to implement on the instrument panel. Turning now to FIG. 2, a process for implementing the measurement system services will now be described. The process described in FIG. 2 assumes that the wireless interface 104 of the vehicle 150 is monitoring the cellular network 120 for system identifications transmitted by cellular towers within range of the vehicle 150.

At step 202, the logic 116 receives a system identification signal from the cellular tower 122 via the wireless interface 104 over the network 120. The system identification uniquely identifies the cellular tower 120.

At step 204, the logic 116 retrieves a table of system identifications from the storage device 114. Alternatively, the controller 102 may be configured via the logic 116 to download the table of system identifications via a network, such as the cellular network 120 or other available network. The table may be downloaded at any time during a driving event of the vehicle 150. For example, when the vehicle 150 roams to a specified region, a new table of system identifications may be downloaded at that time.

At step 206, the logic 116 searches the table for the system identification of the cellular tower 122 and identifies the measurement system mapped to the system identification in the table. For example, if the vehicle 150 is in the greater Detroit metropolitan area, as determined by the system identification of the cellular tower 122, the measurement system mapped to the area is the English measurement system.

At step 208, the measurement system associated with the system identification is communicated by the logic 116 over the vehicle network 106 to the instrument panel 110. The instrument panel 110, in turn, implements the measurement system by displaying the vehicle data (e.g., speed, fuel consumption, distance traveled) and corresponding indicators (e.g., MPH, MPG, and miles).

In an embodiment, the logic 116 may be configured to monitor changes in the measurement systems utilized when the vehicle 150 travels between locations having differing measurement systems. For example, each time the wireless interface 104 receives a system identification of a cellular tower, the logic 116 searches the table to determine the measurement system employed. If the measurement system associated with the system identification is different than the measurement system currently implemented on the instrument panel 110 of the vehicle 150, this means the vehicle 150 has roamed to an area in which a different measurement system is utilized. The logic 116 may be configured to prompt a user to see if the user would like to switch over to the measurement system adopted for the recently identified system identification. This prompt may be implemented in a variety of ways. For example, the user may be prompted via one of the I/O components 108, such as a text prompt displayed on a display screen in the vehicle 150. Another I/O component 108, such as a touch-screen component of the display device or a physical button associated with an infotainment system of the vehicle 150 may be used to confirm the change by the user.

Alternatively, if the vehicle 150 and the wireless interface 104 are Bluetooth-enabled, the logic 116 may transmit a prompt via the controller 102 and the wireless interface 104 to a portable communications device of the user. The confirmation from the user may be implemented via the portable communications device, which confirmation is transmitted wirelessly to the controller 102 via the wireless interface 104.

In another embodiment, the logic 116 may be configured to utilize more than one system identification from multiple cellular towers in determining the measurement system to be provided for display on the instrument panel 110. For example, a triangulation technique may be employed to identify a location of the vehicle 150 and its proximity to the cellular towers providing their system identifications to determine when to change the measurement system or offer to change the measurement system. In this manner, as the vehicle 150 continues to change locations, e.g., in a given direction, the logic 116 is capable of obtaining up-to-date location information, as well as direction information, that can be used in determining which measurement system is most appropriate for display.

In a further embodiment, the prompt may be implemented using the voice-recognition system components 112 of the vehicle 150. For example, telematics systems typically include speech recognition software and text-to-speech software, as well as devices, such as microphones and speakers, to receive and respond to voice communications. The logic 116 may be configured to prompt the user, e.g., with a recorded query for changing the measurement system. The recorded query is presented to the user through an audio system of the vehicle. In addition, the user's confirmation may be delivered as a voice communication that is received and processed by the telematics system components and conveyed to the logic 116 for changing the measurement system on the instrument panel 110.

Additionally, logic 116 implementing the measurement system services may be configured to prompt a user to activate the features of the measurement system services (e.g., instruct the wireless interface 104 to begin monitoring the cellular network 120 for system identifications based on a confirmation received from the user). The user may be prompted using any of the techniques as described above with respect to changing the measurement system en route.

It will be understood that other methods of initiating the measurement system services may be employed in lieu of those described above, which are provided by way of non-limiting examples. For example, the measurement system services may be initiated over a network via a website of a provider of the measurement system services.

Technical effects include selectively employing a measurement system on an instrument panel of a vehicle based on the vehicle's location as determined by cellular towers disposed in a region in which the vehicle is located. A look up table of system identifications of cellular towers, which are mapped to measurement systems utilized in regions corresponding to the system identifications, is used to particularly identify the relevant measurement system to implement on the instrument panel.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system, comprising:
a wireless interface disposed in a vehicle, the wireless interface monitoring a network for signals transmitted by cellular towers, the signals including a first system identification signal transmitted from a first cellular tower of the cellular towers;
a computer processing device communicatively coupled to the wireless interface; and
logic executable by the computer processing device, the logic configured to implement a method, the method comprising:
receiving, via the wireless interface in response to the monitoring, the first system identification signal from the first cellular tower, the first system identification signal uniquely identifying the first cellular tower by a first system identification;
retrieving a table of system identifications including the first system identification from a storage device, each of the system identifications mapped to a corresponding geographic location in which each of the cellular towers is disposed and a corresponding measurement system utilized in the geographic location;
identifying the measurement system from which the first system identification is mapped; and
displaying indicators of the measurement system within an instrument panel of the vehicle;
comparing the measurement system implemented on the instrument panel of the vehicle to another measurement system that is mapped to a second system identification associated with a second cellular tower, the other measurement system being different than the measurement system implemented on the instrument panel; and
in response to determining the measurement system implemented on the instrument panel is different than the other measurement system, prompting a user in the vehicle to authorize a switch from the measurement system implemented on the instrument panel to the other measurement system.

2. The system of claim 1, wherein the wireless interface is a component of a telematics system disposed in the vehicle.

3. The system of claim 1, wherein the wireless interface is a component of a cellular telephone disposed in the vehicle.

4. The system of claim 1, wherein the storage device is disposed in the vehicle.

5. The system of claim 1, wherein the logic further implements:
downloading the table from a storage device residing on a network that is accessible to the computer processor via the wireless interface.

6. The system of claim 1, wherein the indicators of the measurement system include fuel consumption as kilometers-per-liter, distance traveled in kilometers, and vehicle speed as kilometers-per-hour.

7. The system of claim 1, wherein the indicators of the measurement system include fuel consumption as miles-per-gallon, distances traveled in miles, and vehicle speed as miles-per-hour.

8. The system of claim 1, wherein the prompting and response provided by the user are implemented using voice recognition components in the vehicle.

9. A method, comprising:
monitoring a network for signals transmitted by cellular towers, the signals including a first system identification signal transmitted from a first cellular tower of the cellular towers;
receiving, via a computer processing device communicatively coupled to the wireless interface in response to the monitoring, the first system identification signal from the first cellular tower, the first system identification signal uniquely identifying the first cellular tower by a first system identification;
retrieving a table of system identifications including the first system identification from a storage device, each of the system identifications mapped to a corresponding geographic location in which each of the cellular towers is disposed and a corresponding measurement system utilized in the geographic location;
identifying the measurement system from which the first system identification is mapped; and
displaying indicators of the measurement system within an instrument panel of a vehicle;
comparing the measurement system implemented on the instrument panel of the vehicle to another measurement system that is mapped to a second system identification associated with a second cellular tower, the other measurement system being different than the measurement system implemented on the instrument panel; and
in response to determining the measurement system implemented on the instrument panel is different than the other measurement system, prompting a user in the vehicle to authorize a switch from the measurement system implemented on the instrument panel to the other measurement system.

10. The method of claim 9, wherein the wireless interface is a component of a telematics system disposed in the vehicle.

11. The method of claim 9, wherein the wireless interface is a component of a cellular telephone disposed in the vehicle.

12. The method of claim 9, wherein the storage device is disposed in the vehicle.

13. The method of claim 9, further comprising:
downloading the table from a storage device residing on a network that is accessible to the computer processor via the wireless interface.

14. The method of claim 9, wherein the indicators of the measurement system include fuel consumption as kilometers-per-liter, distance traveled in kilometers, and vehicle speed as kilometers-per-hour.

15. The method of claim 9, wherein the indicators of the measurement system include fuel consumption as miles-per-gallon, distances traveled in miles, and vehicle speed as miles-per-hour.

16. The method of claim 9, wherein the prompting and response provided by the user are implemented using voice recognition components in the vehicle.

17. A computer program product comprising a non-transitory computer-readable storage medium having program instructions embodied thereon, which when executed by a computer processor cause the computer processor to implement a method, the method comprising:

monitoring a network for signals transmitted by cellular towers, the signals including a first system identification signal transmitted from a first cellular tower of the cellular towers;

receiving, via a wireless interface in response to the monitoring, the first system identification signal from the first cellular tower, the first system identification signal uniquely identifying the first cellular tower by a first system identification;

retrieving a table of system identifications including the first system identification from a storage device, each of the system identifications mapped to a corresponding geographic location in which each of the cellular towers is disposed and a corresponding measurement system utilized in the geographic location;

identifying the measurement system from which the first system identification is mapped; and displaying indicators of the measurement system within an instrument panel of a vehicle;

comparing the measurement system implemented on the instrument panel of the vehicle to another measurement system that is mapped to a second system identification associated with a second cellular tower, the other measurement system being different than the measurement system implemented on the instrument panel; and in response to determining the measurement system implemented on the instrument panel is different than the other measurement system, prompting a user in the vehicle to authorize a switch from the measurement system implemented on the instrument panel to the other measurement system.

18. The computer program product of claim 17, wherein the wireless interface is a component of a telematics system disposed in the vehicle.

* * * * *